United States Patent [19]
Fay

[11] 3,942,751
[45] Mar. 9, 1976

[54] MOUNT FOR HOSPITAL COMMUNICATIONS SYSTEM

[76] Inventor: James P. Fay, Wolf Creek Road, Ranchester, Wyo. 82801

[22] Filed: Oct. 18, 1974

[21] Appl. No.: 516,033

[52] U.S. Cl............................ 248/280; 179/149
[51] Int. Cl.²........................................ A47F 5/00
[58] Field of Search ........... 248/278, 279, 280, 281, 248/282, 123, 324, 325; 179/149, 150, 148 F

[56] References Cited
UNITED STATES PATENTS

| | | | |
|---|---|---|---|
| 676,441 | 6/1901 | McBerty | 248/278 X |
| 1,197,898 | 9/1916 | Black | 248/278 |
| 1,638,086 | 8/1927 | Carter | 248/278 X |
| 1,733,107 | 10/1929 | Ahlberg | 248/278 X |
| 2,151,877 | 3/1939 | Walker | 248/123 |
| 3,112,968 | 12/1963 | Cotton et al. | 179/149 X |
| 3,269,684 | 8/1966 | Iggulden | 248/123 X |
| 3,409,261 | 11/1968 | Leporati | 248/325 X |
| 3,530,513 | 9/1970 | Mavrer et al. | 248/279 X |
| 3,547,390 | 12/1970 | Mehr | 248/280 |
| 3,742,209 | 6/1973 | Williams | 248/278 X |

*Primary Examiner*—J. Franklin Foss
*Attorney, Agent, or Firm*—Sheridan, Ross & Fields

[57] ABSTRACT

There is provided an improved support for a hospital communication system characterized by a wall mount, an articulated arm secured to the wall mount at one end, and at the other end to a communicator mount, the latter being attached to a communicator unit having signal transmitting means and signal receiving means and characterized in that the communicator unit is rotatable in a vertical plane through a limited arc for convenient viewing by a reclining or sitting patient, and being easily positioned by the patient.

3 Claims, 11 Drawing Figures

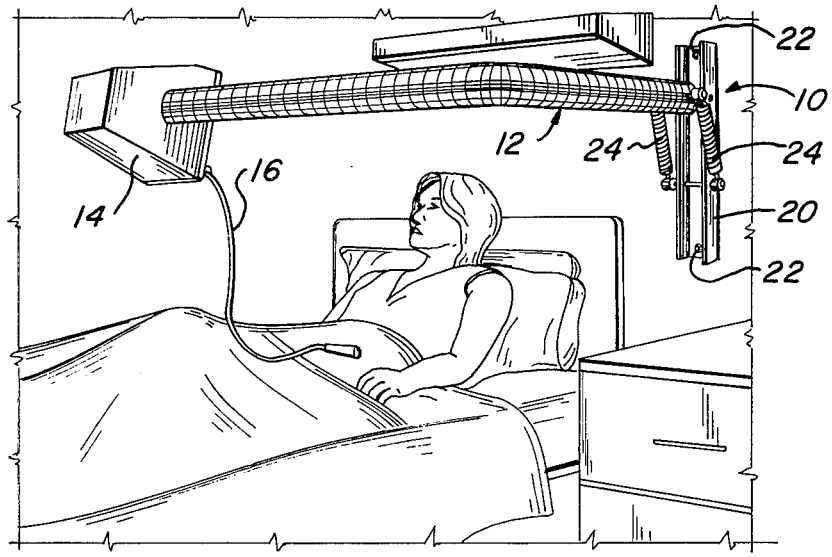
Fig_1
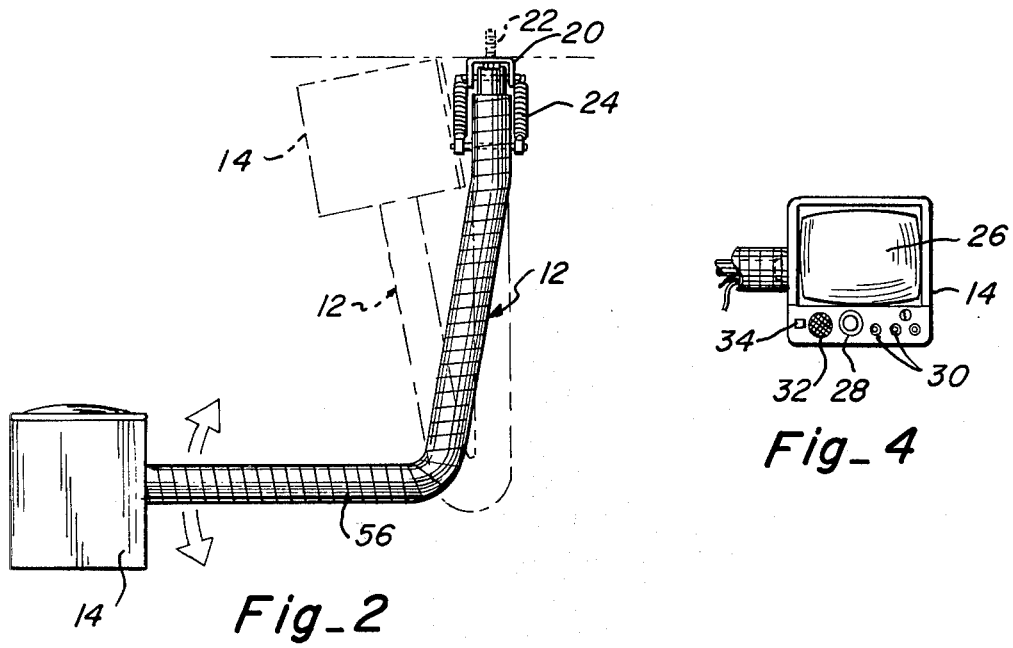
Fig_2
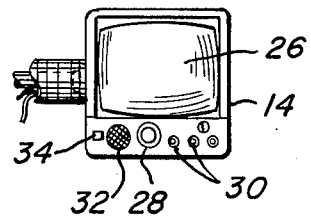
Fig_4
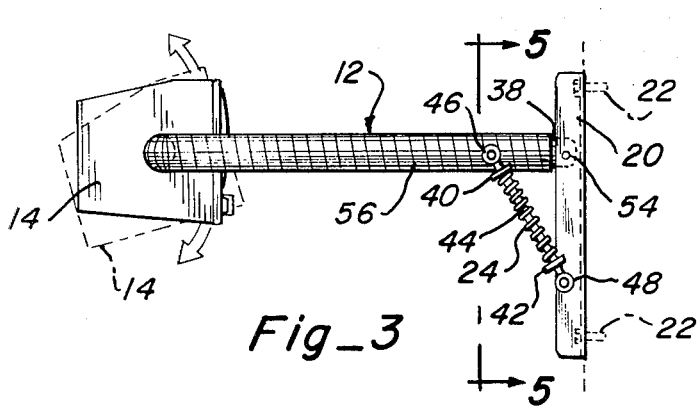
Fig_3
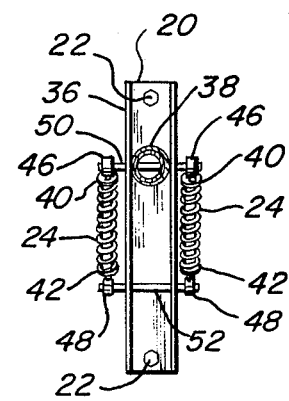
Fig_5

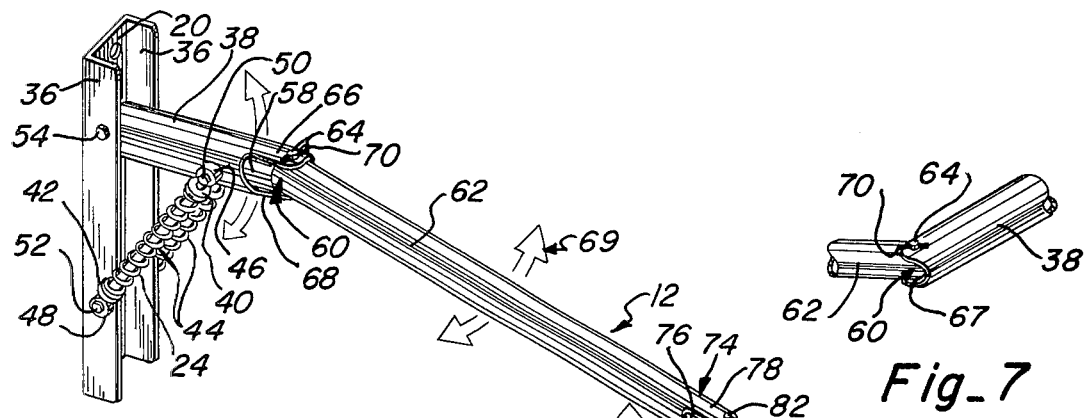
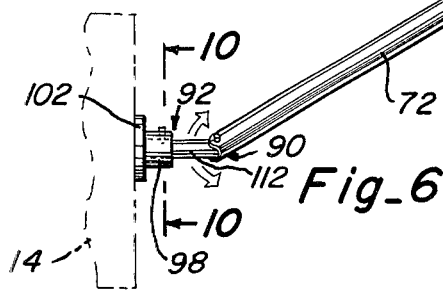
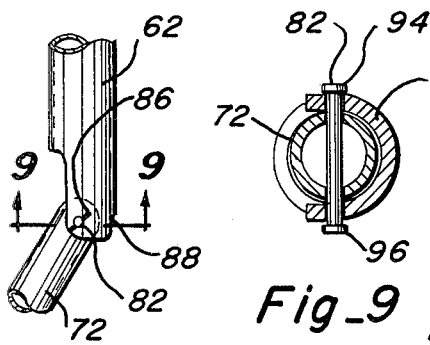
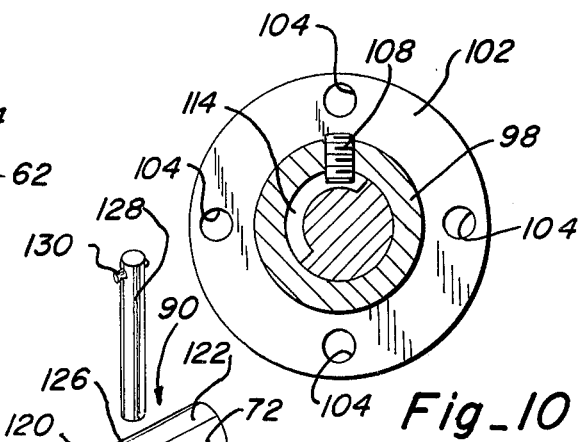
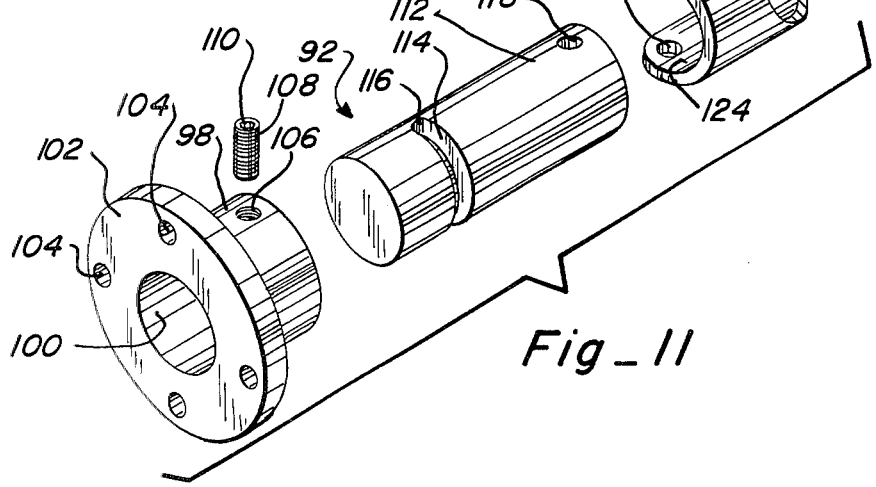

MOUNT FOR HOSPITAL COMMUNICATIONS SYSTEM

BACKGROUND OF THE INVENTION AND PRIOR ART

In the interests of efficiency and possibly lower costs, hospitals have within recent times sought these ends by installation of communication and/or monitoring systems almost on a one-by-one basis. Thus, the patient initially had a call button or line with which to turn on a hall light, and if an attendant or nurse happened to see it, respond thereto. Then two way communication came in and the patient now had a microphone available, and a speaker nearby, each with its lines. Later it became essential not to deprive a patient of his favorite TV programs while in a hospital and a set plus all the necessary cords, cables and remote controls became a necessary part of the equipment along with heart monitors, oxygen lines, etc. As these devices became available, they were generally merely installed one-by-one on a wall behind the patient's bed with one or more wires or leads from each such device until the web of wires and leads was not only confusing but dangerous.

Recent efforts have been directed to consolidating much of the equipment and leads to minimize the confusion and danger, and the present invention is an improvement in this area. Reference may be had to U.S. Pat. Nos. 2,736,888, and 2,910,680 to McLain; 2,896,021 to Phillips, 2,740,842 to Schneider and 3,304,376 to Truby for examples of communication systems directed to patient care and convenience.

The present invention utilizes a multiple communications unit such as that described in my copending application Ser. No. 344,361 filed Mar. 23, 1973. Such a communications unit may include signal receiving means and signal transmitting means, e.g., receiving means for TV programs for patient viewing, with an intercom, non-emergency nurse call, emergency nurse call, or the like. Specially built communications units can thus be produced for hospital patient use and communication with a central nurse station. The present invention provides an improved mounting means for such a unit. It is characterized by low resistance to movement by the patient for adjustment purposes, easy storage out of the way, and serves as a convenient means to consolidate several leads for several services into a common conduit.

BRIEF STATEMENT OF THE INVENTION

Briefly stated, the present invention is in a support for a hospital communications system comprising in combination a wall mount, an articulated arm secured to the wall mount, a communicator mount secured to the articulated arm and to a communicator unit. The wall mount is characterized by a bracket adapted to be fixedly secured to the wall adjacent a patient's bed and has a horizontally extending arm pivotally mounted on a transverse horizontal axis with an angularly related resilient means for resiliently holding the arm in a generally horizontal position. The articulated arm is secured to the horizontally extending arm by a vertically axised pivot and includes at least two arm portions pivotally secured together at confronting extremities also by a vertically axised pin. The communicator mount includes first means for securing the mount at one end to a communicator unit having signal transmitting means and signal receiving means and second means for attaching the mount to the articulated arm. Means are provided which co-act between the first and second means to enable selective rotation of the communicator in a vertical plane through a limited arc greater than 90° and less than 180° for convenient viewing by a reclining or sitting patient.

In a preferred embodiment of the present invention, the horizontally extending arm, the articulated arm portions and the elements of the communicator mount are preferably of tubular and circular cross section enabling the passage of smaller wires and tubes therethrough as may be required for servicing the communicator system. The resilient means which supports the horizontally extending arm portion from the bracket in a generally horizontal position desirably includes at least one coil spring surrounding a telescoping rod attached at one end to the bracket and at the opposite end to a point on the horizontally extending arm remote from the supporting bracket.

BRIEF DESCRIPTION OF THE DRAWINGS

The present invention may be better understood by having reference to the annexed drawings wherein:

FIG. 1 is an environmental illustration showing a communicator unit supported in position over the bed of a hospital patient and in position for viewing of an associated TV monitor by a reclining patient.

FIG. 2 is a top view of the apparatus shown in FIG. 1 and showing a stored position in dotted lines.

FIG. 3 is a side elevation of the apparatus shown in FIG. 2 and showing in dotted lines the TV monitor rotated in a position for viewing by a patient sitting in bed.

FIG. 4 is a front view of a TV monitor and communications unit of the type for which the mounting of the present invention is especially adapted.

FIG. 5 is a cross-sectional view of the support or mount of the present invention as it appears in the plane indicated by the line 5—5 in FIG. 3.

FIG. 6 is a perspective view of the mount or support of the present invention showing the wall mount, the articulated arm portions, and the communicator unit mounting system, with a protective covering removed.

FIG. 7 is a fragmentary illustration in perspective on an enlarged scale of a joint between the horizontally extending arm and the articulated arm.

FIG. 8 is a fragmentary illustration on an enlarged scale of the joint between the outermost arm portion and the communicator mount.

FIG. 9 is a cross-sectional view on an enlarged scale of the joint shown in FIG. 8 as it appears in the plane indicated by line 9—9.

FIG. 10 is a cross-sectional view of a portion of the communicator mount as it appears in the plane indicated by the line 10—10 in FIG. 6.

FIG. 11 is an exploded view on an enlarged scale of a communicator mount useful in accordance with the present invention.

DETAILED DESCRIPTION OF THE DRAWINGS

Referring now more particularly to FIG. 1, there is here shown a portion of a patient's room with a support unit of the present invention mounted on the wall adjacent the patient's bed and including a wall mount generally indicated at 10, an articulated arm generally indicated at 12 and a communicator unit 14. A nurse call line 16 is disposed in easily accessible position to the patient and fitted with a call button switch 18. The wall mount 10 includes a bracket 20 adapted to be secured to the wall as by spring wing bolts 22. The articulated arm 12 is conveniently supported by a horizontally extending arm in a generally horizontal position by means of a pair of coil springs operating between end caps attached to a telescoping rod as will be hereinafter more particularly described.

Referring to FIGS. 2 to 5 inclusive, FIG. 2 shows the articulated arm 12 in a patient viewing position such as illustrated in FIG. 1. In dotted lines there is shown the device in a stored position out of the way. The arrows in FIG. 2 show the directions of movement in an horizontal plane which can be achieved by the distal extremity of the articulated arm 12. In FIG. 3, the arrows show the movement of the communications unit 14 about a horizontal axis whereby the communications unit can be adjusted for viewing by a patient in either the sitting position where the patient's head is above the level of the television monitor as shown in dotted lines, or in the position shown in solid lines for viewing from a half sitting position.

FIG. 4 shows a communications unit 14 with a TV screen 26, a channel selector 28 and other TV controls 30. A speaker 32 is provided for giving instructions to the patient from the central nurse's station, and a call button jack 34 is provided for attachment of the call button line 16.

FIG. 5 is a view of the apparatus shown in FIG. 3 as it appears in the plane indicated by the line 5—5. As shown in FIG. 5, the channel 20 is provided with left and right upstanding flanges 36. As best shown in FIGS. 3 and 5, the resilient supporting means for the horizontally extending arm 38 is composed of a pair of coil springs 24 operating between distal end caps 40, and proximal end caps 42. The end caps 40 and 42 have extending therethrough the extremities of a telescoping rod, each of the extremities external of the end caps 40 and 42 having an eye member 46 and 48 (FIG 3) attached thereto. The eye members 46 at the distal extremity of the supports is bored to receive a pin 50 which extends through the right and left hand eye members 46 and through the horizontally extending arm 38. In like manner, the eye members 48 at the proximal extremity of the springs is drilled to receive a pin 52 which is of sufficient length to pass through the parallel upstanding walls 36 of the channel member 20. The securement of the ends of the pins 50 and 52 is conventional, for example, a cotter pin. The horizontal arm member 38 is also pivotally secured to the channel member 20 by means of a pivot pin 54. Thus, the horizontal arm portion 38 is mounted for limited resilient movement in a vertical plane about the pin 54. Thus, if the patient should grab or otherwise place a downwardly directed load on the apparatus, the springs 24 will allow sufficient "give" to absorb such load without damage to the apparatus and when the load is released, return the apparatus to its normal unstressed position. In more specific embodiments, the eye members 46 and 48 may be threadedly secured to the telescoping rods 44 so as to permit some adjustment of the apparatus whereby a substantially horizontal disposition may be secured. When the apparatus is as nearly to horizontally disposed as desired, the apparatus can be adjusted and positioned for viewing by the patient with very little effort. For convenience and appearance, the articulated arm portion 12 including the horizontally extending arm 38 and the communicator support portion later to be discussed is covered with a flexible tubular covering 56 conveniently formed of a spirally wound wire covered with a thin plastic film. These tubular coverings are of conventional structure and commercially available.

Referring now more particularly to FIGS. 6, 7, 8 and 9, the various components are shown in perspective in FIG. 6, and details thereof shown in FIGS. 7, 8 and 9. The protective and/or decorative coating or covering 56 has been removed for better visibility of the parts. The horizontally extending arm portion 38 is as shown by the arrows in FIG. 6 disposed for limited movement in a vertical plane as controlled by the telescoping rod 44. Such rods 44 normally have an internal stop at each end of the stroke as is well-known. The distal extremity of the horizontally extending arm portion 38 is provided with a cut-out 58 on one side thereof to permit the installation of the proximal extremity 60 of the articulated arm 12. The external diameter of the articulated arm portion 62 is less than the internal diameter of the horizontally extending arm portion 38. Thus, the provision of a pin 64 vertically extending through the upper tongue portion 66, the proximal extremity or end 60 of the arm portion 62 and the lower tongue portion 68 provides an axis about which the articulated arm portion 62 may rotate. The pin 64 is held against falling out by any suitable means such as a cotter pin 70. While there may be a dimensionally corresponding opening 67 on the opposite side of the horizontally extending arm portion 38, for most purposes only one such opening is required, and rotation of the arm portion 62 past center limited or entirely prevented.

The reverse side of the joint between the horizontally extending arm portion 38 and the articulated arm portion 62 is shown in enlarged detail in FIG. 7. The pin 64 is conveniently provided with a cotter pin 70 to hold it in position. Any suitable means of holding the pin 64 may be employed, another holding means being illustrated and discussed in connection with FIG. 9. In order to provide a relief for the distal extremity 60 of the arm portion 62, there may be provided a cut-out portion 67. The cut-out portion will also provide for slight over-center movement of the arm portion 62 in the direction of the arrow 69. The combination of the cut-out portions 58 and 67 will enable folding of the arm 62 with respect to the horizontally extending portion 38, except for interference with the wall, of almost 180°.

In most cases without loss in rigidity of the tongue portions 66 and 68, the smaller cut-out 67 can be made on the opposite side thereof and will allow more freedom of movement and slight over-center movement of the arm portion 62 relative to the horizontally extending arm 38. It will also be found desirable to round off the proximal extremity of the articulated arm portion 62 to prevent interference between the proximal extremity 60 and the internal side wall of the horizontally extending arm portion 38.

As indicated the articulated arm 12 is composed of a first articulated arm portion 62 and a second articulated arm poriton 72. The distal extremity 74 of the articulated arm portion 62 is shaped in a manner similar to that of the distal extremity of the horizontally extending arm portion 38 for pivotal acceptance of the articulated arm portion 72. Thus, there is provided a cut-out portion 76 resulting in tongue portions 78 and 80 on the upper and lower surfaces of the tubular member 62. The outside diameter of the tubular portion 72 is again less than the internal diameter of the articulated arm portion 62, and hence the vertical extension of a pin 82 through the upper tongue portion 78, the proximal extremity 84 of the tubular member 72 and the lower tongue portion 80 provides a vertical axis about which the articulated arm poriton 72 may rotate relative to the articulated arm portion 62 in a horizontal plane. The relative rotations of the arm portion 62 and the arm portion 72 is indicated by the arrows associated with each such arm portion. As better shown in FIG. 8, a cotter pin 86 may be provided for securement of the vertically disposed pin 82. Also, in order to permit a slight amount of over-center movement of the arm portion 72 with respect to the arm portion 62, there may be provided a small cut-out 88 of relatively small axial dimension to provide some relief for movement of the arm 72. Such a cut-out will also reduce interference between the proximal extremity 84 of the smaller tube 72 as it pivots about the pin 82 and the inner wall of the tube 62.

The communicator unit 14 is secured to the distal extremity 90 of the articulated arm portion 72 by means of a communicator mount generally indicated at 92 (FIG. 6).

FIG. 9 shows a typical elbow for the articulated arm and is a section as it appears in the plane indicated by the line 9—9 in FIG. 8. Instead of a cotter pin 86 as shown in FIG. 8, the pin 82 may be provided with heads 94 and 96 to hold the pin 82 in proper position to serve as a vertical axis permitting relative movement between the arms 62 and 72.

Referring now more particularly to FIGS. 10 and 11, there is here shown in more detail the communicator mount 92. The communicator mount 92 is best shown in exploded relation in FIG. 11 and includes a flanged sleeve 98 having a bore 100 extending therethrough and a flange 102 drilled as at 104 to receive mounting bolts for securement to the communicator unit 14, such bolts not being shown. The sleeve 98 is provided with a drilled and tapped hole 106 into which is later fitted a threaded pin 108 having an Allen socket 110 at the distal extremity thereof. A cylinder 112 is provided and dimensioned for a sliding fit with the bore 100 and of sufficient length to extend beyond the sleeve 98. At the proper axial location, there is provided an arcuate slot 114 which is dimensioned to receive the inner end of the threaded pin 108. The threaded pin 108 is also dimensioned for movement within the confines of the slot 114 without interference with the side walls thereof except at the extremities such as the extremity 116 which serves as an abutment to prevent further rotational movement about the axis of the cylinder 112. The total extend of the arcuate slot 116 is less than about 180° and greater than 0° and preferably 120°. It is positioned so as to allow a slight upward inclination of the communicator unit 14 and a vertically downward disposition of the television screen 26. Any further extent of the slot than these preferred extremities will be dictated by the circumstances of the particular installation. However, a rotational extent of about 120° going slightly beyond the vertical by, say, 10° to 15°, and from 10° to 15° below the horizontal as best shown in FIG. 10 has been found satisfactory for most purposes. These limits will allow viewing of the television from the bed as well as from a chair.

The cylinder or shaft 112 is provided at its distal extremity with a vertically directed bore 118. The cylinder 112 is of smaller external diameter than the internal diameter of the distal extremity 90 of the auxiliary arm portion 72. The distal extremity of the arm portion 72 is provided with a cut-out portion 120 similarly to the other arm portions above described, and the tongue portions 122 and 124 are suitably drilled as at 126 to receive a pin 128. When the parts are assembled, the pin 128 extends through the hole 126 in tongue portion 122, the bore 118 in the proximal extremity of the cylinder 112 and through the bore 126 in the tongue portion 124. A cotter 130 may be used to secure the pin in proper position. Thus it will be seen, that the communicator mount may be moved in a horizontal plane as indicated by the arrows in FIG. 6, and because of the pin 108 and the slot 114 permits limited rotation of the communicator unit 14 in a vertical plane to accommodate the viewing position of the patient.

The communicator wires, cables, etc., are threaded through the articulated arm portion 72 and 62 and through the horizontally extending arm portion 38 for attachment to appropriate sources of input or output as may be required. As indicated, after the wires and cables are installed, the entire assembly may be covered with a decorative and protective flexible sleeve 56.

It is believed evident from the foregoing description that the support for the hospital communicator system is adapted for convenient storage and convenient positioning for use by a patient. Instead of a plurality of wires, cables, lines, etc., issuing from diverse spaced points on a wall, the present apparatus provides a flexible conduit therefor from a single outlet through the wall behind the support bracket 20 and leading to a communicator unit combining a plurality of services including television, non-emergency call, emergency call, voice communication, etc. Other services such as continuous electrocardiogram heart monitoring, etc., may also be supplied through the same conduit if desired. The apparatus can be constructed to withstand considerable weight applied thereto in a downward direction by the patient and because of the resilient mounting means will be returned to a substantially horizontal position where minimum friction or resistance to adjustment by the patient will be encountered. When a doctor is examining the patient or the equipment is to be stored, the apparatus is readily adaptable to a stored position such as shown in dotted lines in FIG. 2 well out of the way.

What is claimed is:
1. A support for a hospital communications system and television comprising in combination:
 a. a wall mount including a bracket adapted to be secured to the wall adjacent a patient's bed, a horizontally extending arm pivotally mounted on a transverse horizontal axis onto said bracket and resilient means extending between said bracket and said horizontal arm for resiliently holding said arm in a generally horizontal position;
 b. an articulated arm secured to the distal extremity of said horizontally extending arm of said wall mount by a vertically axised pivot and including at least two arm portions pivotally secured together at confronting extremities by a vertically axis pin; and
 c. a communicator mount including a flanged sleeve for securing the mount at one end to a communicator unit, having signal transmitting means and signal receiving means, and a cylindrical member pivotally secured to said articulated arm by a vertically axised pin, and means coacting between said first and second means for selectively rotating said communicator in a vertical plane through a limited arc greater than 90° and less than 180° for convenient viewing by a reclining or sitting patient.

2. A support in accordance with claim 1 in which the selective rotation means includes an arcuate slot in said sleeve and a pin extending from said cylindrical member for coaction in said slot to limit rotation of the cylindrical member and limit axial movement thereof relative to said sleeve.

3. A support for a hospital communication system and television comprising in combination:
   a. a wall mount including a channel-shaped bracket having parallel projecting flange members, said bracket adapted to be secured to the wall adjacent a patient's bed, a horizontally extending arm pivotally mounted on a transverse horizontal axis onto said flange members and resilient means for resiliently holding said arm in a generally horizontal position including a coil spring coacting around a telescoping rod member and between end caps pivotally secured on horizontal axes to said bracket and said horizontal arm, respectively;
   b. an articulated arm secured to the distal extremity of said horizontally extending arm of said wall mount by a vertically axised pivot and including at least two tubular arm portions pivotally secured together at confronting extremities by a vertically axised pin; and
   c. a communicator mount including a flanged sleeve for securing the mount at one end to a communicator unit, having signal transmitting means and signal receiving means, and a cylindrical member pivotally secured to said articulated arm by a vertically axised pin, and means coacting between said first and second means for selectively rotating said communicator in a vertical plane through a limited arc greater than 90° and less than 180° for convenient viewing by a reclining or sitting patent, said selective rotation means including an arcuate slot in said sleeve and a pin extending from said cylindrical member for coaction in said slot to limit rotation of the cylindrical member and limit axial movement thereof relative to said sleeve.

* * * * *